May 15, 1923.

W. G. SHELTON

POWER DRIVEN IMPLEMENT FOR CUTTING HAIR OR THE LIKE

Filed May 14, 1919

1,455,274

WITNESS:
René Bruine

INVENTOR:
William Gentry Shelton,
By Attorneys,

Patented May 15, 1923.

1,455,274

UNITED STATES PATENT OFFICE.

WILLIAM GENTRY SHELTON, OF NEW YORK, N. Y.

POWER-DRIVEN IMPLEMENT FOR CUTTING HAIR OR THE LIKE.

Application filed May 14, 1919. Serial No. 297,083.

*To all whom it may concern:*

Be it known that I, WILLIAM GENTRY SHELTON, a citizen of the United States of America, residing in the borough of Manhattan, city, county, and State of New York, have invented certain new and useful Improvements in Power-Driven Implements for Cutting Hair or the like, of which the following is a specification.

This invention relates to improvements in power-driven clippers or implements for cutting hair or the like, and aims to provide improvements therein.

The present invention provides a powerdriven clipper wherein the electric motor for supplying the power is associated with the handle and cutter parts, and wherein the arrangement is such that the heat of the motor is not objectionably communicated to the hand of the user of the implement.

The invention further provides a simple and economically produced implement of the character described. Other features of improvement will be hereinafter set forth.

An embodiment of the invention is illustrated in the accompanying drawings, wherein—

Figure 1:
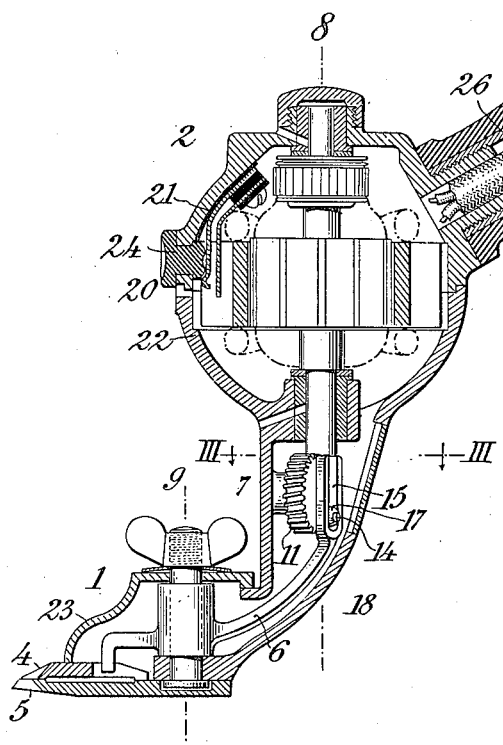
Figure 1 is a longitudinal sectional view of said embodiment.
Figure 2:
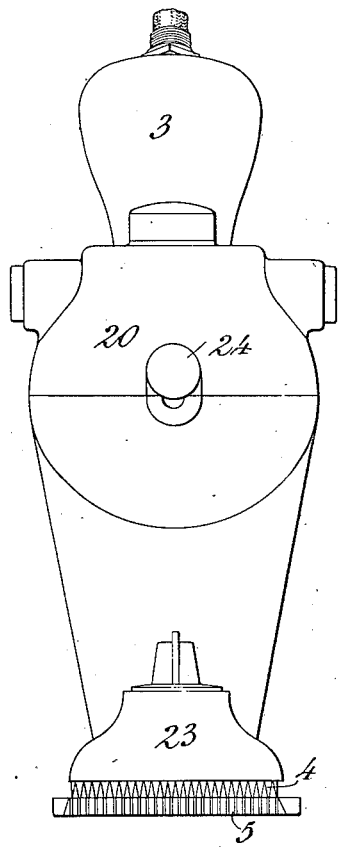
Fig. 2 is a front elevation.
Figure 3:
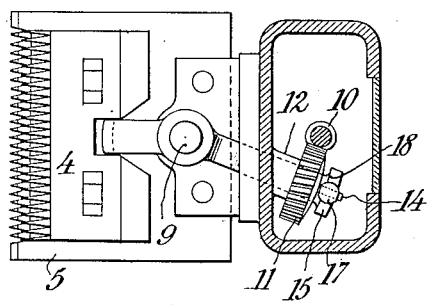
Fig. 3 is a cross section on the line III–III, Fig. 1.

In said drawings, numeral 1 designates the cutter mechanism, 2 the motor and 3 the handle.

The cutter preferably comprises blades 4 and 5, one of which, as for example the blade 4, is reciprocated over the other. 6 designates a two-armed oscillatory lever, driven by the motor 2 through a reduction transmission or gearing 7.

The axis 8 of the motor is preferably substantially parallel to the axis 9 of the oscillatory lever 6, and has on said axis, connected to the driving shaft of the motor, a worm 10. In connection with the worm 10 is a gear 11. The gear 11 is mounted upon a pin 12, the axis of which is radial to the axis 9 of the cutter. The gear 11 has a crank pin 14 thereon, and the lever 6 has a slotted or bifurcated portion 15, in which the pin 14 works. The pin 14 preferably has thereon a ball 17, and the contiguous walls of the slotted portion 15 and the lever 6 have a corresponding contour, as indicated at 18. The contiguous faces of the gear 11 and portion 15 of the lever 6 are preferably respectively spherically convex and concave.

The motor 2 and the cutter are preferably enclosed within a single casing 20, comprising the parts 21 and 22, the bottom cutter 5 being secured to said casing, and the upper cutter being partially covered and pressed upon by a spring pressed cover plate 23.

24 is a switch device whereby the motor may be conveniently started and stopped.

The handle 3 is preferably attached to the casing at an angle to the axes 8 and 9, the angular disposition corresponding to the levers upon hand-actuated clippers, now generally used, as for example the Brown and Sharpe clipper.

The handle 3 is conveniently provided with a passage 26 for the leading in wires to the electric motor.

The arrangement of the handle and motor casing permits of the motor being made sufficiently large in size to develop the driving force required, and to avoid excessive heating, and the handle is not subject to the direct heating effects of the motor, so that it may be grasped and used with comfort.

The invention may receive other mechanical expressions than that herein specifically illustrated and described.

What is claimed is:

1. An implement for hair-cutting comprising a motor, a cutting tool, an oscillatory tool-actuating lever and a worm and gear transmission between said motor and lever, said motor and lever turning on substantially parallel axes, said gear turning on an axis radial to the axis of said lever, and said lever having one end bent upward to a position substantially parallel with the axis of said motor, whereby said motor may be located substantially above the heel of said cutting tool.

2. An implement for hair-cutting comprising a motor, a cutting tool, an oscillatory tool-actuating lever and a worm and gear transmission between said motor and lever, said motor and lever turning on substantially parallel axes, said gear turning on an axis radial to the axis of said lever, and said lever having one end bent upwardly and laterally to a position substantially parallel with and to one side of the axis of said motor, whereby said motor may be located substantially above the heel of said cutting tool.

3. An implement according to claim 1, further characterized by said gear having a crank pin thereon coacting with the upwardly bent end of said lever.

In witness whereof, I have hereunto signed my name.

WILLIAM GENTRY SHELTON.